A. W. PAULL & J. F. MILLER.
MANUFACTURE OF LAMP OR LANTERN GLOBES, CHIMNEYS, &c.
No. 10,149. Reissued July 4, 1882.
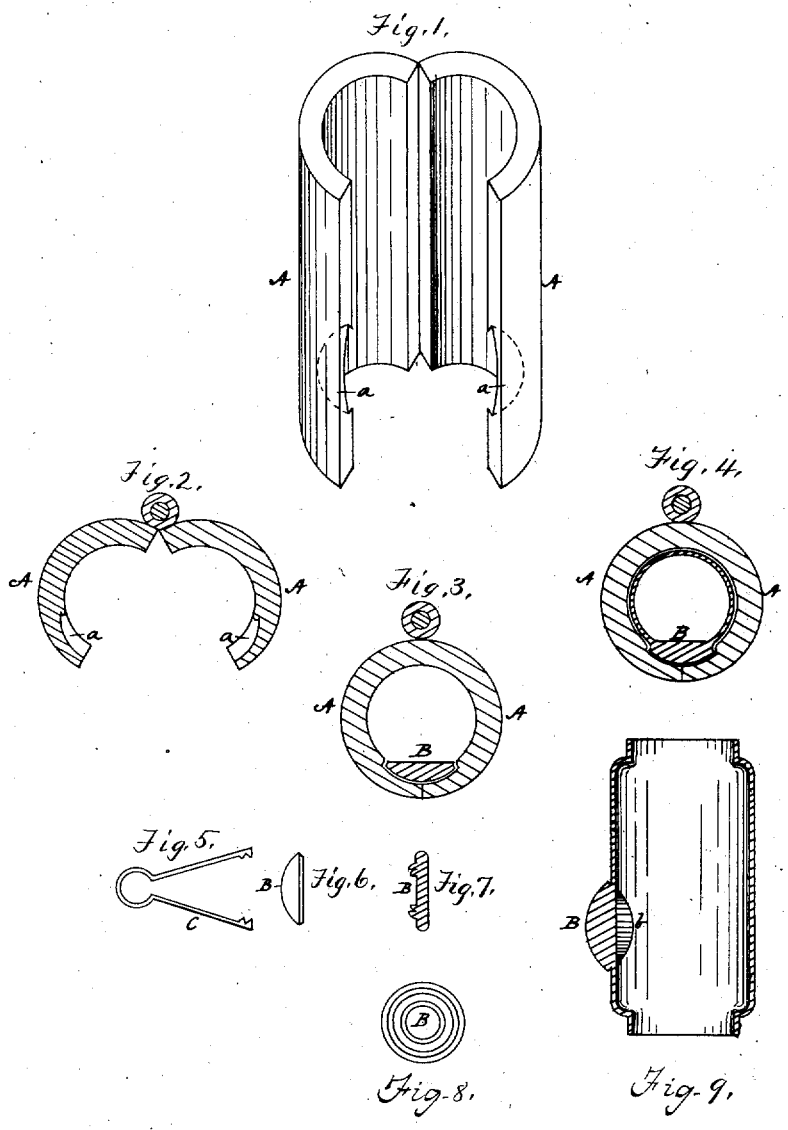
Witnesses
R. C. Wormshall
H. B. Conwin
Inventor
Archibald W. Paull
John F. Miller
by their attys
Bakewell & Kerr

UNITED STATES PATENT OFFICE.

ARCHIBALD W. PAULL, OF WHEELING, WEST VIRGINIA, AND JOHN F. MILLER, OF MARTIN'S FERRY, OHIO.

MANUFACTURE OF LAMP OR LANTERN GLOBES, CHIMNEYS, &c.

SPECIFICATION forming part of Reissued Letters Patent No. 10,149, dated July 4, 1882.

Original No. 256,156, dated April 11, 1882. Application for reissue filed June 6, 1882.

*To all whom it may concern:*

Be it known that we, ARCHIBALD W. PAULL, of Wheeling, in the county of Ohio and State of West Virginia, and JOHN F. MILLER, of Martin's Ferry, in the county of Belmont and State of Ohio, have invented a new and useful Improvement in the Manufacture of Lamp or Lantern Globes, Chimneys, &c.; and we do hereby declare the following to be a full, clear, and exact description thereof, reference being had to the accompanying drawings, and to the letters of reference marked thereon.

Our invention has relation to the manufacture of globes, chimneys, shades, reflectors, and similar articles intended to surround the flame or light of any illuminating apparatus, such as lamps, lanterns, head-lights, gas-burners, vapor-burners, electric lights, &c.

The object of our invention is to produce such articles with a lens or with lenses forming a part thereof for the purpose of more effectively concentrating or otherwise controlling the light upon the same principles and for like purposes as separate lenses have been heretofore used—as, for instance, like the well-known bull's-eye lens in the common "dark-lantern," in the light-house lamp, &c.

Heretofore it has been proposed to swell or bulge or enlarge a portion of the globe or chimney to form a lens thereon. This does not afford the desired refraction and concentration of the light, for it leaves the so-called "lens" part of the globe or chimney of substantially uniform thickness throughout, and that only about the thickness of the walls of the chimney or globe. The lenses so formed are of no practical use for the purposes intended. We overcome these defects and produce a chimney or globe, &c., having a reliable, practical, and efficient lens or lenses of proper construction at one or more points on its circumference, forming a part of the article or made integral therewith; and to accomplish this our invention involves certain novel and useful improvements in the manufacture and in the means employed to carry them out, as will be herein first fully described, and then pointed out in the claims.

To illustrate our improvements, we have chosen an ordinary form of lantern or lamp globe and a mold suitable for making it; but it should be understood that the mere form or shape of the globe or protector is in no wise essential to the invention, which can be practiced in connection with any form, pattern, or size.

In the accompanying drawings, forming part of this specification, Figure 1 is a perspective view of a mold made in two parts and adapted to receive the lens, which mold is one form that may be employed in carrying out our invention. Fig. 2 is a horizontal section of the mold in the position indicated in Fig. 1; and Fig. 3 is a similar view, showing the two parts of the mold closed together. Fig. 4 is a horizontal section through the mold and the contained chimney or globe with the lens formed thereon in accordance with our invention. Fig. 5 is a view of a pair of tongs or pinchers which may be employed for grasping and locating the lens in the cavity provided for it in the mold. Fig. 6 is an edge view of one form of lens proposed to be applied upon the globe or chimney. Fig. 7 is a section, and Fig. 8 a plan or face view, of a modified form of lens (commonly known as the "Fresnel" lens) which may be applied instead of the plain lens. Fig. 9 is a sectional view and partial elevation of an ordinary form of globe or chimney completed in accordance with our invention.

These illustrations, in connection with the following explanations, will be found sufficient to enable others skilled in the art to which our improvements pertain to practice and use our invention, and in all the figures of the drawings like letters of reference, wherever they occur, indicate corresponding parts.

A A are two parts of a glass-mold formed for the purpose of shaping the chimney. These parts are suitably hinged or otherwise connected, so that they can be opened to remove the completed article, and so that when properly closed together they will match in a manner well understood. A recess, *a*, is formed in the walls of the mold, communicating with the interior thereof, and one half in one section, the other half in the opposite section, of the mold, as indicated, which recess is for the reception of a lens already formed.

B is the lens, which, as will be observed, has an edge so formed that it will be readily encompassed by the margin of the recess in the mold, and, when placed in this recess, be firmly held with its inner face exposed to the interior of the mold. The lens B is first formed or molded in proper size and shape to correspond with recess *a*. While still hot it is grasped by any convenient implement, as the tongs C, which barely touch the lens at two points on its margin, and is held in proper place in the opening of the mold. The two sections of the mold are then quickly closed together, so as to support the lens in the recess *a*, the tongs C being withdrawn before the closing is completed, for which purpose they are preferably made of thin metal, so as to take up but little room between the two parts of the mold. As soon as the lens is located and the mold closed the glass for the chimney or globe is introduced and blown in the usual manner to fill the mold and the article completed in a manner well understood. By following this method it will be observed that the finishing of the globe or chimney upon the lens adds to the thickness of the lens a layer of material equal in thickness to that of the other part of the walls of the article, preserving an inner face parallel with the original face of the lens, so that if the inner face of the separate lens be made flat it will still appear so in the completed article. In like manner, if it be desired to employ a lens with a concave or convex inner face, the same shape will be preserved after the additional thickness of material is applied. The lens being placed in the mold in a highly-heated state, and the material for the mold or chimney immediately blown upon it or against it, a thorough welding of the parts takes place, leaving no joint or seam between the material of the globe or chimney, but bringing the whole out in one homogeneous mass. A seam or joint between the parts would of course destroy the effectiveness of the lens. The sectional view, Fig. 3, indicates the separate lens as placed in its recess in the mold ready to be welded with the material of the globe or chimney; and in Fig. 4 the section indicates the completed article, wherein the thickness of the lens is increased by an amount of material equal to that of the walls of the article. The sharp edge of the lens, as shown, facilitates its insertion in the recess of the mold and insures its being firmly held all around when the mold is closed. This edge may be varied in any suitable way, if desired.

Instead of the plain bull's-eye lens, any other form of lens may be applied by properly preparing the mold to receive it.

In Figs. 7 and 8 we have shown a ribbed or corrugated lens, intending to indicate thereby that the size and shape of the lens are in no way essential.

It will appear that to blow or mold a lens upon a globe or chimney, which lens shall be thicker in the center than at the edges, is impracticable without the application of the separate lens, substantially as above indicated.

The utility of the globe or chimney, with the lens forming a part thereof, is sufficiently obvious. It enables one to employ the illuminating apparatus for its usual purposes without interference, and at the same makes a globe or protector by which the light may be concentrated or directed toward any point at will.

Of course the invention will be found most serviceable in hand-lanterns or in those intended to be carried about; but, as before explained, the improved article may be applied upon any form of illuminator. When applied upon the shades for house-lamps, particularly upon those having a base of translucent or transparent material and known as "base-shades," the lens affords means for throwing the light across the room in a powerful manner, and thus adds to the desirable qualities of such shades, as will be readily understood.

Of course the chimney or globe, &c., may be made up in accordance with our invention of the materials usually employed in the manufacture of similar articles without the addition of the lens.

To apply two or more lenses to one article the mold must be suitably modified to accommodate the increased number.

When the flat-faced lens is to be applied upon a cylindrical-walled article, substantially as shown in Fig. 9, the mold should be so formed as to bring the walls of the article out to the edge of the recess by any gently-curved surface, as at *b*. If the face of the article be flat or plain, as sometimes may occur, then the mold has only to be supplied with a recess for the lens, as at *a*. The lens might be formed with an inner face curved so as to correspond with the curvature of the walls of the article, in which case the inclined part *b* need not be provided for.

What we claim as our invention, and desire to secure by Letters Patent, is—

1. As a new article of manufacture, a lamp-chimney or globe having one or more lenses integral with and protruding from its outer surface at one or more points in its circumference and additional to the thickness of its side, substantially as and for the purposes described.

2. A sectional mold for making chimneys and similar articles, provided with a recess or recesses common to adjacent sections for containing a lens or lenses in the cavity of the mold, so that the article formed in the mold may unite with such lens or lenses when molded therein, substantially as and for the purposes described.

3. The method of making glass chimneys and globes with an attached lens or lenses, consisting of forming the lens or lenses in a separate mold or molds, placing the lens or lenses in a cavity or cavities in the side of the chimney or globe mold, and then forming the chimney or globe therein against the lens or lenses, so that the external surface of the chimney or globe shall unite with the inner surface of the lens or lenses, substantially as and for the purposes described.

In witness whereof we have hereunto set our hands.

ARCHIBALD W. PAULL.
JOHN F. MILLER.

Witnesses:
T. B. KERR,
L. C. FITLER.